United States Patent Office 3,600,413
Patented Aug. 17, 1971

3,600,413
N-ALKYLATION OF AROMATIC AMINES
Robert A. Grimm, Lakeville, Minn., assignor to Ashland Oil & Refining Company, Houston, Tex.
No Drawing. Filed May 16, 1968, Ser. No. 729,563
Int. Cl. C09f 7/00; C07c 121/52, 101/78, 87/28, 29/02
U.S. Cl. 260—404                                      8 Claims

ABSTRACT OF THE DISCLOSURE

A method for producing N-alkylated aromatic amines comprising coreacting carbon monoxide, hydrogen, an aromatic amine, and an olefinic compound at pressures above 200 p.s.i. in the presence of a catalyst which is the reaction product of:

(A) a salt selected from the group consisting of rhodium halides, ruthenium halides, and cobalt carbonyls, with
(B) a complexing agent selected from the group consisting of trihydrocarbyl phosphine, trihydrocarbyl arsine, and trihydrocarbyl stibine.

An N-alkylated aromatic amine of the formula:

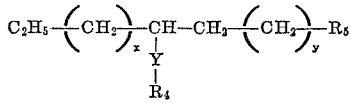

wherein:

Y is —CH=N— or —CH$_2$—NH— wherein the nitrogen atom is directly bonded to R$^4$;
R$^4$ is an aromatic radical;
R$^5$ is —H, —CH$_3$, —CH, —OH, —CHO, —NH$_2$

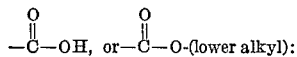

$x$ is an integer from 0 to 23 inclusive;
$y$ is an integer from 0 to 23 inclusive; and
$x+y$ is 0 to 23.

---

This invention relates to the synthesis of certain classes of N-alkylated aromatic amines. These classes are anils, also known as "Schiff's bases"; N-alkylated aromatic secondary amines; and N-alkylated aromatic tertiary amines.

According to the present invention, there is provided a method for producing N-alkylated aromatic amines, comprising coreacting carbon monoxide, hydrogen, an aromatic amine, and an olefinic compound at pressures above 200 p.s.i. in the presence of a catalyst which is the reaction product of:

(A) a salt selected from the group consisting of rhodium halides, ruthenium halides, and cobalt carbonyls, with
(B) a complexing agent selected from the group consisting of trihydrocarbyl phosphine, trihydrocarbyl arsine, and trihydrocarbyl stibine.

The salts useful in forming the catalysts employed in the present invention are preferably rhodium or ruthenium halides, and preferably chlorides. The most preferred salt is rhodium trichloride. Less preferred because of the resultant lower yields of N-alkylated aromatic amines are the cobalt carbonyls, such as cobalt octacarbonyl. The catalysts of the present invention are formed by coreacting one of the above-described salts with a complexing agent. These complexing agents can be trihydrocarbyl phosphines, arsines, or stibines, and are preferably those of Formula I:

(I)                     (R$^1$)$_3$X wherein R$^1$ is a hydrocarbyl radical, and is preferably phenyl or lower alkyl, and X is arsenic or antimony, or, preferably, phosphorus. The most preferred single catalyst is rhodium trichloride tris(triphenylphosphine) because of its ease of formation and the high yield of N-alkylated aromatic amine. The catalysts can be employed in any amount sufficient to catalyze the reactant and are generally present in an amount equal to 0.1 to 5.0, and preferably 0.2 to 0.4 weight percent of catalyst, based on the weight of the olefinic material.

A broad class of amines can be employed in the present invention, but the preferred amines are aromatic amines having a dissociation constant, pK, measured in aqueous solution of from 8.5 to 11.5, and preferably 9 to 10. Aromatic amines with dissociation constants outside these ranges can be employed, but the reaction rate is adversely affected. A preferred class of aromatic amines are those of Formula II:

(II)

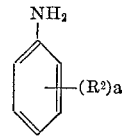

wherein R$^2$ is halogen, lower alkyl, or lower alkoxy, and $a$ is an integer from 0 to 3 inclusive. Examples of suitable aromatic amines include, among others, aniline; o-, m-, and p-anisidine; m- and p-chloroaniline; o-, m- and p-toluidine; 2,3- 2,5-, and 2,6-xylidine; 2-bromo-4,6-dichloroaniline; 1-amino - naphthalene; 1-amino-4-bromonaphthalene; 1-amino-2,4-dibromonaphthalene; 1-amino-4-fluoronaphthalene; 1-amino-3-methyl-naphthalene; 1,6-diaminonaphthalene; p-phenylene diamine; and N-phenyl-p-phenylene diamine. Aniline is the most preferred aromatic amine because of cost, availability, and reactivity. Nonaromatic amines, such as ammonia, methylamine, and diethylamine, are unsuitable because they inhibit the reaction of the aromatic amine and do not thelmseves undergo reaction.

A broad class of olefinic compounds can be employed in the present invention, although certain classes are preferred. The olefinic compound can have one or more, but preferably has one ethylenically unsaturated double bond which can be internal or terminal. In general, olefinic compounds having only one ethylenically unsaturated double bond react faster than compounds having a plurality of such double bonds, and, in general, compounds in which the double bond is terminal, i.e. those having a vinyl group of the formula CH$_2$=C<, react faster than compounds in which the double bond is internal. Examples of suitable classes of olefinic compounds include ethylenically unsaturated fatty acids, ethylenically unsaturated fatty nitriles, alpha-olefins, dienes, vinyl monomers, and acrylic monomers. A class of preferred olefinic compounds are those of Formula III:

(III)                     C$_n$H$_m$—R$^3$ wherein $n$ is an integer from 2 to 27 inclusive; $m$ equals $2n$ or $2n-1$ or $2n-2$; and R$^3$ is —H, —OH, —CN, or

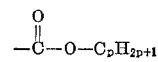

wherein $p$ is an integer from 1 to 27 inclusive.

The preferred olefinic compounds of Formula III are the alpha-olefins of Formula IV:

(IV)   $\text{CH}_2\text{=CH—C}_n\text{H}_{2n+1}$ wherein $n$ is an integer from 4 to 25 inclusive.

Yet another class of olefinic compounds are the cyclic olefins of Formula V:

(V) 

wherein $n$ is an integer from 2 to 8 inclusive, and $m$ equals $2n-2$ or $2n-3$. Examples of suitable olefinic compounds include, among others, α-olefins such as 1-hexene, 1-octene, 1-hexadecen, 1-docosene, and 1,1-dimethylethylene; substituted α-olefins such as ethyl undecylenate; internal olefins such as 2-hexene, 3-octene, 4-octene, mixed hexadecenes, 3-methyloctene-3, and cyclohexene; substituted internal olefins such as methyl oleate, ethyl oleate, oleonitrile, methyl palmitoleate, and oleyl alcohol; dienes such as 1,5-cyclooctadiene, ethyl linoleate, linoleic acid, and linoleyl alcohol; conjugated diolefins such as 1,3-butadiene, acrylonitrile, ethyl methyl acrylate, methyl acrylate; aromatic olefins such as stilbene and styrene; and naturally occurring triglycerides of ethylenically unsaturated fatty acids such as tallow, soybean oil, coconut oil, linseed oil, cottonseed oil, tung oil, and oiticica oil.

The process of the present invention is practiced by combining the reactants in a suitable reactor at pressures of 200 to 2000, and preferably 1000 to 1500 p.s.i.g., until the reaction is complete as indicated by an increase in pressure when additional carbon monoxide and hydrogen are added. The N-alkylated aromatic amines produced by the process of the present invention will be N-alkylated aromatic secondary amines or N-alkylated aromatic tertiary amines or anils, depending upon reactants and reaction conditions. At temperatures of 50° to 125° C., the reaction proceeds according to Equation 1 to give a product which is almost exclusively that anil, whereas at temperatures of 150° to 200° C., the reaction proceeds according to Equation 2 or 3 to give a product which is almost exclusively the above-described secondary or tertiary amines. Thus, the anils are produced at temperatures of about 50° to 150° C., and the N-alkylated aromatic secondary and tertiary amines are produced at temperatures of about 125° to 200° C. The above-described tertiary amines usually result when the olefinic compound has terminal unsaturation and is present in a molar ratio of olefinic compound:aromatic amine of greater than 1:1 as shown in Equation 2, whereas the above-described secondary amines usually result when the olefinic compound has internal unsaturation according to Equation 3.

(Equation 1)

$\text{CO} + \text{H}_2 + \text{R}^4\text{NH}_2 + \text{—CH=CH—} \longrightarrow$

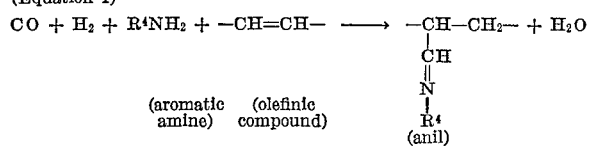

(Equation 2)

$2\text{CO} + 4\text{H}_2 + \text{R}^4\text{NH}_2 + 2\text{CH}_2\text{=CH—} \longrightarrow$
    (aromatic  (α-olefin)
    amine)

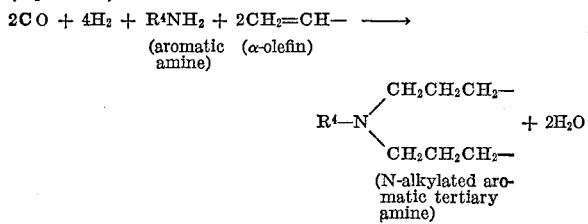

(Equation 3)

$\text{CO} + 2\text{H}_2 + \text{R}^4\text{NH}_2 + \text{—CH=CH—} \longrightarrow$

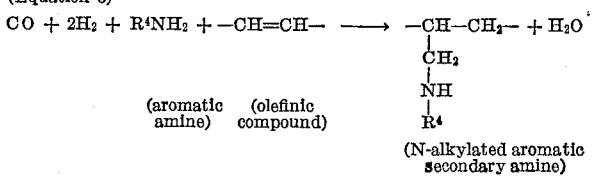

The reaction can be conducted in the absence of solvents. However, common solvents such as ethanol, methanol, and benzene do not adversely affect the reaction. Although the reactants are preferably combined in the stoichiometric ratios shown in Equations 1, 2, and 3, a wide variety of ratios can be employed. The molar ratios of aromatic amines to olefinic compound is 10:1 to 1:10, and preferably 1:1 to 4:1. Greater amounts of excess aromatic amine can be employed but are simply recovered unreacted. The molar ratio of hydrogen to carbon monoxide can be from 1:2 to 10:1, but no advantage is achieved by departing from the stoichiometric ratio of 2:1 when producing N-alkylated aromatic amines; or 1:1 when producing anils. Partial pressures of carbon monoxide in excess of 0.6 of the total reaction pressure should be avoided, since they have been found to inhibit the reaction. If such a partial pressure accidentally occurs, the reaction can be restarted by venting the reactor to reduce the partial pressure of carbon monoxide and by adding hydrogen to re-establish the desired hydrogen:carbon monoxide ratio.

According to another aspect of the present invention, there are provided novel fatty N-alkylated aromatic amines of Formula VI:

(VI) 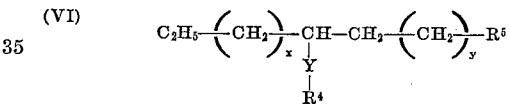

wherein Y is —CH=N— or —CH$_2$—NH— wherein the nitrogen atom is directly bonded to R$^4$; R$^4$ is an aromatic radical of 6 to 20 carbon atoms, but is preferably phenyl or naphthyl; R$^5$ is —H, —CH$_3$, —CN, —OH, —CHO, —NH$_2$,

or —C—O-(lower alkyl); $x$ is an integer from 0 to 23 inclusive; $y$ is an integer from 0 to 23 inclusive; and $x+y$ is 0 to 23.

The fatty alkyl esters and nitriles of Formula VI can be produced by the process of the present invention described above with reference to Equations 1, 2, and 3. The fatty acids of Formula VI can be produced by saponification of the corresponding fatty esters by known procedures, whereas the fatty alcohols can be produced by reduction of the fatty acids and the fatty aldehydes by oxidation of the fatty alcohols. The fatty amines of Formula VI can be produced by hydrogenation of the fatty nitriles.

All of the compounds of the present invention, as well as the saturated analogs, can be quaternized with hydrocarbyl halides such as methyl chloride or benzyl chloride, to produce quaternary ammonium compounds which when applied in the form of emulsions to fabrics such as cotton will render the fabric softer and/or bacteriostatic and/or antistatic. The acid salts of the mono- and dialkylanilines, such as the hydrochlorides, hydrobromides, and acid sulfates, when applied as an emulsion or solution to wood surfaces, inhibit attack by rodents. These acid salts, in particular the hydrochlorides, hydrobromides, and phosphates, are also useful as components of gasoline wherein they prevent or inhibit carburetor icing. For this application, compounds of Formula VI, wherein $x+y$ is at least 6, are desirable because of their increased solubility in gasoline. The dialkyl and monoalkylanilines; the acid salts of N-phenylaminomethylated oleic acid, ethyl oleate, triglycerides, and oleylnitrile are also suitable for this application. The acids and esters of Formula VI, wherein Y is —$CH_2$—NH—, are useful as textile modifiers or can be employed to modify known "wash and wear" resins. The apparent reaction by which modification occurs is esterification of the acid or ester with the resin. N-phenylaminomethyl stearyl amine, when reacted with a diisocyanate such as General Mills DDI, a $C_{36}$ aliphatic diisocyanate, gives a composition that can be applied to substrates as a protective or decorative coating. These compositions cure to a tough, clear, flexible polymeric film. Similarly, the N-cyclohexylaminostearyl amine is useful in polyureas, or can be reacted with diacids to give novel polyamides.

The invention is further illustrated by the following examples in which all parts and percentages are by weight unless otherwise indicated. These non-limiting examples are illustrative of certain embodiments designed to teach those skilled in the art how to practice the invention and to represent the best mode presently known for carrying out the invention. In these examples TAN means "Total Amine Nitrogen," TLC means "thin layer chromatography," and IR means "infra-red." In these examples, $z$ is employed to designate the number of the carbon atom of the fatty radical to which the aromatic amino methylene radical is attached. The aromatic amino methylene radical can attach to either of the carbon atoms of the original double bond, and the double bond can be located in a number of places in the fatty chain, as is well-known in the art. Thus, $z$ can be any integer from 6 to 14 inclusive. NMR means "nuclear magnetic resonance."

EXAMPLE 1

This example illustrates the synthesis of a rhodium catalyst, termed Catalyst A, useful in the present invention.

Triphenyl phosphine (15 g.) is dissolved in a hot 95 weight percent aqueous ethanol mixture (200 ml.) to form a phosphine solution. Rhodium trichloride (3 g.) is dissolved in a hot 95 weight percent aqueous ethanol mixture (200 ml.) and this solution added to the phosphine solution. Upon cooling, an orange precipitate (10.8 g.; M.P. ca. 270° C.) falls out. This precipitate is dried in air, and is termed Catalyst A. Catalyst A is reported by B. W. Malerbi, Plat Metals Rev., 9, 47–50 (1965) to be 1,2,3 - tris(triphenylphosphine)trichlororhodium, while J. A. Osborn, F. H. Jardine, J. F. Young and G. Wilkenson, J. Chem. Soc. (A), 1711 (1966), report these conditions to give tris(triphenylphosphine)chlororhodium. The melting point of Catalyst A suggests that it is mainly the former with smaller amounts of the latter.

EXAMPLE 2

This example illustrates the synthesis of a ruthenium catalyst, termed Catalyst B, useful in the present invention.

The procedure described by Malerbi, supra, is followed and the $[Ru_2Cl_3(\phi_3P)_6]^+Cl^-$ recovered and designated Catalyst B.

EXAMPLE 3

This example illustrates the synthesis of a cobalt catalyst, termed Catalyst C, useful in the present invention.

In a hood equipped with an exhaust fan are mixed cobalt octacarbonyl (1 g.) and triphenylphosphine (1.5 g.) in benzene (5 ml.). When reaction subsides, the solution is used immediately and is termed Catalyst C.

EXAMPLE 4

This example illustrates the synthesis of additional catalysts useful in the present invention.

Referring to Table I, the catalysts having the designations in column 1 are produced by reacting the rhodium halide of column 2 with the Group V-A compound of column 3 in a manner analogous to that of Example 1.

TABLE I

| (1) Catalyst (desig.) | (2) Rhodium halide (formula) | (3) Compound of Group V-A Element (formula) |
|---|---|---|
| D | $RhCl_3$ | $(C_6H_5)_2PC_2H_5$ |
| E | $RhCl_3$ | $(C_2H_5)_3P$ |
| F | $RhCl_3$ | $(CH_3)_3P$ |
| G | $RhCl_3$ | $(C_2H_5)_3As$ |
| H | $RhCl_3$ | $(CH_3)_3As$ |
| J | $RhCl_3$ | $(C_6H_5)_3As$ |
| K | $RhCl_3$ | $(C_2H_5)_3Sb$ |
| L | $RhCl_3$ | $(C_6H_5)_3Sb$ |
| M | $RhF_3$ | $(C_6H_5)_3P$ |
| N | $RhF_3$ | $(C_2H_5)_3P$ |
| O | $RhF_3$ | $(C_2H_5)_3As$ |
| P | $RhF_3$ | $(C_6H_5)_3Sb$ |

EXAMPLE 5

This example illustrates the synthesis of Schiff's bases according to the present invention.

Into a 300 ml. magnetically stirred autoclave are placed the ethyl esters of selectively hydrogenated tall oil (65 g.), aniline (19.5 g.), and Catalyst A (0.3 g.). The autoclave is sealed and the heater and stirrer started. The autoclave is then pressurized with carbon monoxide to 600 p.s.i.g. followed by hydrogen until the pressure increases to 1200 p.s.i.g., whereupon heating is commenced. When the autoclave reaches reaction temperature (98° C.), the pressure begins to drop. The pressure is then maintained at 1200 p.s.i. with alternative additions of hydrogen and carbon monoxide supplied at an approximate molar ratio of 2:1, until the pressure drops cease, which occurs after about one hour. The autoclave is then cooled, vented, and opened. The contents are removed and distilled under vacuum at 12 mm. Hg absolute taking the indicated weights of Fractions I and II having the indicated boiling points.

| Fraction | Weight (g.) | Boiling point (° C.) |
|---|---|---|
| I | 5 | 130–150 |
| II | 60.8 | 180–218 |

Fraction II is the product (70% yield), a yellow oil with a total amine nitrogen ("TAN") value of 3.1–3.2% N ($HClO_4$). The theoretical TAN value is 3.35% N. The yellow oil also contains infra-red absorptions at 3400 cm.$^{-1}$ (N—H), 1735 cm.$^{-1}$ (COOEt), 1660 cm.$^{-1}$ (N=CH), 1600 cm.$^{-1}$ and 1500 cm.$^{-1}$ (phenyl). The product of this reaction is almost exclusively the Schiff base of ethyl formylstearate.

The selectively hydrogenated tall oil employed in this example is a mixture of fatty acids 95 weight percent of which contain 18 carbon atoms and are mono-unsaturated. Of the unsaturation 35% is trans. The ethyl ester is formed by simply heating the fatty acids with ethanol in the presence of a known esterification catalyst.

EXAMPLES 6, 7 AND 8

These examples illustrate the synthesis of amines according to the present invention, employing fatty acid amines.

The procedure of Example 1 is closely repeated employing the same quantities of reactants and the same times and conditions, except that the ethyl ester of hydrogenated tall oil is replaced by an equimolar amount of the fatty ester of column 2 of Table II, the molar ratio of aniline to fatty ester is changed to that of column 3, and the reaction times and temperatures are those shown in columns 4 and 5. The yield is recorded in column 6.

The products in these cases are the N-phenylaminomethylated esters. Typical analysis: TAN 3.45% N, Calculated 3.47% N; IR bands at 3410 cm.$^{-1}$ (N—H), 1735 cm.$^{-1}$ (COOR), 1610 cm.$^{-1}$ and 1510 cm.$^{-1}$ (phenyl). The absence of a band at 1660 cm.$^{-1}$ shows the absence of a Schiff base.

*Elemental analysis.*—Calculated for $C_{27}H_{47}NO_2$ (Example 6) (percent): C, 77.70; H, 11.27; N, 3.36. Found (percent): C, 77.90; H, 11.68; N, 3.51.

TABLE II

| (1) Example No. | (2) Fatty ester (desig.) | (3) Molar ratio of aniline to fatty ester (unitless) | (4) Time (hrs.) | (5) Temp. (° C.) | (6) Yield (percent) |
| --- | --- | --- | --- | --- | --- |
| 6 | Same as Example 5 | 1.56:1 | 1.66 / 0.25 | 122 / 150 | 78 |
| 7 | do | 1.5:1 | 4.33 / 0.4 | 122 / 140 | 77 |
| 8 | Methyl oleate [1] | 1.4:1 | 2.75 | 122 | [2] 57 |

[1] The methyl oleate was prepared by fractionation of commercial methyl oleate on a 40-plate spinning band column, and 98% thereof contained 18 carbon atoms in the fatty acid radical, 6% of which were trans unsaturated.
[2] 72% based on recovered starting materials.

EXAMPLE 9

This example illustrates the synthesis of amines according to the present invention, employing a terminal olefin.

In a manner similar to that of Example 5, 1-hexadecene (100 g.), aniline (60 g.), and Catalyst A (0.3 g.) are reacted in an autoclave. At 122° C. the pressure drop per unit time is found to be over 1000 p.s.i.g./min. Within 20 minutes the reaction is substantially complete. The product from the autoclave is then distilled to give N-heptadecyl aniline (12.5 g., TAN 3.90% N, calcd. 4.22% N). N,N-diheptadecyl aniline (45.5 g., TAN 2.11% N, calcd. 2.46% N) remains as the pot residue which is decolorized by percolation of a benzene solution through a column of alumina.

EXAMPLE 10

This example illustrates the synthesis of amines according to the present invention, employing an α-olefin in the presence of ethanol as a solvent.

1-decene (111 g.), aniline (50 g.), ethanol (25 ml.), and Catalyst A (0.3 g.) are sealed in an autoclave and reacted as described in Example 4, except that the autoclave is heated to 150° C. for 30 minutes after rapid gas absorption has ceased. The autoclave is then cooled and the contents distilled rapidly to give the product (115 g.). Only a very small amount of material remains in the distillation flask. The product consists of N-undecyl aniline (TAN, calcd. 3.49% N. Found: 3.51%), boiling point 118° C./0.01 mm. Hg, 34% yield and N,N-diundecyl aniline (TAN, calcd. 5.67% N. Found: 5.77% N), boiling point 193° C./0.015 mm. Hg, 66% yield.

EXAMPLE 11

This example illustrates the synthesis of amines according to the present invention, employing a fatty nitrile as the olefin.

In a manner similar to that of Example 5, oleonitrile (84 g.), aniline (60 g.), and Catalyst A (0.3 g.) are reacted at 121° C. in an autoclave with hydrogen and carbon monoixide. After cooling, the contents of the autoclave are distilled. The main fraction distills at 212° C./0.075 mm. Hg, to give about 71.5 g. (59%) of a yellow oil N-phenylaminomethylstearonitrile. (TAN, calcd. 3.66% N. Found: 3.77% N) The infra-red spectrum of the product has an absorption at 2250 cm.$^{-1}$ characteristic of the nitrile group.

EXAMPLE 12

This example illustrates the hydrogenation of nitriles of the present invention to produce diamines.

N-phenylaminomethylated stearonitrile (71 g.) of Example 11 is mixed with a solution of ammonia in methanol (5.4 equivalents/1tr., 100 ml.) and Raney nickel (1 tsp.) in an autoclave. The reaction mixture is kept at 38° C. for 5 hours under a hydrogen pressure of about 1000 p.s.i.g. The autoclave is emptied and the contents concentrated and distilled under vacuum to give a major fraction having a boiling point of 204–224° C. at 0.1 mm. Hg, as a pale yellow oil which is the N-phenylaminomethylstearylamine.

*Analysis.*—Calcd.: Aliphatic amine 3.75% N. Found: Aliphatic amine 3.72% N. Calcd.: Aromatic amine 3.75% N. Found: Aromatic amine 3.72% N.

EXAMPLE 13

This example illustrates the synthesis of acids of the present invention from corresponding alkyl esters.

A sample of N-phenylaminomethylated methyl oleate (methyl N-phenylaminomethylstearate) (41 g.) of Example 8 is mixed with dilute ethanolic potassium hydroxide (14 g. KOH in 200 ml. 50% aqueous ethanol) and heated at 50° C. for 4 hours. After the solution has cleared, it is acidified with acetic acid to give an oil identified as N-phenylaminomethyl stearic acid. This oil is extracted into ether, and the extracts are washed with water several times. The extract is then dried (Na$_2$SO$_4$) and concentrated under vacuum to give a yellow oil that analyzes as follows:

TAN, calcd. 3.59% N. Found: 3.25% N.
Neut. eq., calcd. 389.5 g./eq. Found: 389 g./eq.

EXAMPLE 14

This example illustrates the synthesis of amines according to the present invention, employing a cyclic olefin.

In a manner similar to that of Example 11, 1,5-cyclooctadiene (50 ml.), aniline (100 ml.), ethanol (50 ml.), and Catalyst A (0.3 g.) are reacted with carbon monoxide and hydrogen. Distillation of the reaction mixture gives a mixture of products (47 g.) with an average total amine nitrogen value of 6.0. (Theory for a 1:1 adduct, 6.50% N.)

EXAMPLE 15

This example illustrates the synthesis of amines according to the present invention, employing a naturally occurring triglyceride as the olefin.

Soybean oil (125 g.), aniline (60 g., 0.65 mole), and Catalyst A (0.4 g., 4×10$^{-4}$ mole) are sealed in an autoclave equipped with a stirrer. The stirrer is started and carbon monoxide added until the pressure increases to 600 p.s.i.g. Hydrogen is then added until the pressure further increases to 1200 p.s.i.g. The reaction is run at 107° C. for 1.5 hours and then at 125° C. for 4.5 hours while adding carbon monoxide and hydrogen to maintain the pressure at 1200 p.s.i.g. The autoclave is then cooled, vented, and the contents removed. The reaction mixture is steam distilled until the distillate is free of aniline. The distillate is then dissolved in benzene and passed over a column of alumina (Alcoa F–20) to remove the catalyst. The resulting product is then concentrated to a cloudy oil (103 g.) TAN 1.40% N. Thin-layer chromatography of this sample in benzene shows it to be homogeneous and free of unreacted aniline.

EXAMPLE 16

The procedure of Example 15 is repeated, except that the soybean oil is replaced with tallow, with similar results.

EXAMPLE 17

This example illustrates the synthesis of ethyl z-(N-cyclohexylaminomethyl) stearate wherein z is 6 to 14 by hydrogenation.

Ethyl z-(N-phenylaminomethyl)stearate (117 g., 0.28 mole) of Example 7, ethanol (75 ml.) and 5% Rh/C catalyst (4 g.), available from Englehard Industries, are placed in a 300 ml. autoclave and the mixture is vigorously stirred at 110° C. under a hydrogen pressure of 1400 p.s.i.g. After 7 hours, more 5% Rh/C (4 g.) is added and the above conditions are repeated for 3 hours. Upon cooling, the reaction mixture is removed from the autoclave, filtered and concentrated under vacuum. A portion of the residue (100 g.) is then vacuum-distilled to give a water-white mobile oil (78 g.), boiling point 221–223° C./0.4 mm. Hg. The infra-red spectrum of this oil is free of aromatic absorptions at 1500 cm.$^{-1}$ and 1600 cm.$^{-1}$.

*Analysis.*—Calcd. for $C_{27}H_{53}NO_2$ (percent): TAN (aliphatic 3.30); TAN (aromatic 0.0); tertiary amine nitrogen 0.0; primary amine nitrogen 0.0. Found (percent): TAN (aliphatic 3.2); TAN (aromatic 0.1); tertiary amine nitrogen <0.25; primary amine nitrogen <0.21.

EXAMPLE 18

This example illustrates the synthesis of methyl z-(N-phenylaminomethyl)stearate wherein z is an integer of from 6 to 14 inclusive.

Into an autoclave equipped with a stirrer are placed methyl oleate (98.5 g., 0.33 mole), aniline (34 g., 0.37 mole), and Catalyst A (0.3 g., 3×10$^{-4}$ moles). The autoclave is then sealed and the stirrer started before carbon monoxide (0–750 p.s.i.g.) and hydrogen (750–1500 p.s.i.g.) are added. The reaction mixture is then heated at 125° C. for 165 minutes, during which time additional hydrogen and carbon monoxide are added. The autoclave is then cooled, vented, and opened. The contents are removed and the autoclave rinsed with benzene which is then added to the water-containing reaction mixture and concentrated on a rotary evaporator. Upon standing overnight, part of the crude reaction mixture (3 g.) crystallizes, is removed by filtration and recrystallized twice from acetone to give shiny white plates, melting point 74.5–75.5° C.

*Analysis.*—Calcd. for $C_{26}H_{45}NO_2$ (percen*t*): C, 77.36; H, 11.25; N, 3.47. TAN (aromatic 3.47); TAN (aliphatic 0.0). Found (percent): C, 77.23; H, 11.26; N, 3.53. TAN (aromatic 3.45); TAN (aliphatic 0.0).

The rest of the reaction mixture is fractionally distilled to give a lower boiling fraction (19.4 g.) of methyl oleate. The main fraction (76 g.) distills from 206–218° C./0.05 mm. Hg (most at 211–212° C./0.05 mm. Hg). A center cut is taken for analysis.

*Analysis.*—Found (percent): C, 77.61; H, 11.42; N, 3.57. TAN (aromatic 3.52); TAN (aliphatic 0.0).

The distillation residue (8 g.) is shown by TLC analysis (benzene) to contain some of the main reaction product. All of the high boiling fraction gives only a single spot by TLC (benzene).

The NMR spectrum of the main fraction shows absorptions at δ0.8–2.5 p.p.m. (several overlapping absorptions, 34.2, $C_{17}H_{34}$), 3.0 p.p.m. (doublet, $J_{AB}5H^z$, 2.0,

3.64 p.p.m. (two singlets, partially superimposed, 4.0, —NH— and —OCH$_3$), and 6.4–7.4 p.p.m. (complex multiplet, 4.8, $C_6H_5$).

EXAMPLES 19–25

These examples further illustrate the present invention employing certain fatty olefinic compounds reacted under varying conditions.

The procedure of Example 18 is followed, employing the same times, conditions and reactants, except that the methyl oleate is replaced by an equimolar amount of the olefinic compound of column 2, Table III, the molar ratio of aniline to olefinic compound is that of column 3, the reaction conditions are those of columns 4 and 5, and the type and amount of products are shown in columns 6 and 7.

TABLE III

| (1) Example No. | (2) Olefin (design.) | (3) Molar ratio of aniline to olefin (unitless) | (4) Time (hrs.) | (5) Temp. (° C.) | (6) Products Type (design.) | (7) Yield (percent) |
|---|---|---|---|---|---|---|
| 19 | (²) | 1.5:1 | 1.6 / 0.3 | 122 / 150 | Et z-(N-PAM)stearate ⁴ | 78 |
| 20 | (²) | 1.5:1 | 4.3 / 0.4 | 122 / 140 | Et z-(N-PAM)stearate | 77 |
| 21 ¹ ³ | (²) | 2.5:1 | 3.0 | 150 | Aniline plus N-PAM product undistillable redisue | 28 |
| 22 ¹ | (²) | 2.5:1 | 2.0 | 125 | Et z-(N-PAM)stearate | >30 / 70 |
| 23 ¹ | (⁵) | 3.4:1 | 2.0 | 100 / 160 | Aniline of monoaldehyde-uncertain structure TAN 3.08% | 18 |
| 24 | Oleylnitrile | 1.7:1 | 2.5 | 122 | Mixture of anil. and N-PAM stearylnitrile | 67 |
| 25 | Tallow | 4.0:1 | 2.0 / 1.5 | 135 / 160 | Solid triglyceride TAN 0.9% | |

¹ Ethanol used as a solvent.
² The ethyl ester of the selectively hydrogenated tall oil fatty acids of Example 5.
³ Catalyst A replaced by an equal weight of Catalyst C.
⁴ Et is ethyl, z is 7 to 13, PAM is phenylaminomethyl.
⁵ Ethyl linoleate is prepared by esterification of ethyl alcohol with a sample of linoleic acid (>95%) supplied by the U.S. Department of Agriculture Northern Regional Laboratory.

EXAMPLE 26

This example illustrates the hydrogenation of nitriles of the present invention to produce z-(N-phenylaminomethyl)-stearylamine.

The oleylnitrile derivative containing both the Schiff base and the N-phenylaminomethylstearylnitrile (71 g., 0.19 mole) of Example 24 is mixed with a 5.4 N solution of ammonia in ethanol (100 ml.) and Raney nickel (1 tsp.) in an autoclave. The reaction mixture is heated to 38° C. for 5 hours under a hydrogen pressure of 1000 p.s.i.g. The autoclave is then emptied and the contents filtered, concentrated and distilled under vacuum to give a main fraction (28 g.), boiling point 204–224° C./0.1 mm. Hg, as a nearly colorless oil. Analysis by TLC (benzene-ether-ammonium hydroxide, 50:49:1) shows that the main fraction is homogeneous.

*Analysis.*—Calcd. for $C_{25}H_{46}N_2$ (percent): TAN (aliphatic 3.74); TAN (aromatic 3.74). Found (percent): TAN (aliphatic 3.72); TAN (aromatic 3.72).

EXAMPLE 27

This example illustrates the synthesis of an anil according to the present invention.

Into an autoclave are charged ethyl octadecenoate (130 g., 0.42 mole), aniline (76.5 g., 0.82 mole), and Catalyst A (0.3 g., $3 \times 10^{-4}$ mole). The autoclave is then sealed, the stirrer started and carbon monoxide (0–700 p.s.i.g.) and then hydrogen (700–1400 p.s.i.g.) added. The autoclave is heated to 103° C. within 15 minutes and reaction, as indicated by a pressure drop, occurs rapidly, exhibiting a pressure drop per unit time of about 100 p.s.i.g./min. After the reaction temperature has been maintained for 2 hours, the autoclave is cooled, vented, emptied, and the reaction mixture distilled. After the excess aniline is removed, the temperature quickly rises to 200° C./0.5 mm. Hg and the product, a yellow oil (141 g., 82% of theory), is collected in the range of 200–204° C., most at 228° C. at 0.5 mm. Hg. The distillation residue (17 g.) is found by TLC (benzene) to be similar to the distillate. TLC of this reaction product shows a spot due to aniline and another spot indicating another aromatic amine upon spraying with developer (ceric ammonium sulfatesulfuric acid). Heating of the chromatogram shows an additional spot. That this anil probably contained a small amount of the N-phenyl-aminomethylated product is indicated by the TLC behavior and by the infra-red spectrum which had absorptions at 3400 cm.$^{-1}$ (N–H), 1735 cm.$^{-1}$ (COOEt), 1660 cm.$^{-1}$ (—N=CH—), 1600 cm.$^{-1}$ and 1500 cm.$^{-1}$ (phenyl).

*Analysis.*—TAN (aromatic), calcd. 3.35%. N.W. 417.5 g./mole. TAN, found 3.16%. M.W. 406 g./mole.

Steam distillation of this material and subsequent vacuum distillation gives a main fraction boiling point 158° C./0.02 mm. Hg that is free of aniline. This sample forms a 2,4-dinitrophenylhydrazone that is recrystallized from cold ethanol, melting point 45–46° C.

EXAMPLE 28

This example illustrates the process of the present invention employing a ruthenium catalyst.

Into an autoclave is charged 1-hexadecene (100 ml.), aniline (50 ml.), and Catalyst B (0.3 g.). The autoclave is sealed and pressurized and the hydrogen and carbon monoxide added. After 3 hours at 140° C., the reaction is stopped and the reaction mixture distilled to give N-heptadecylaniline (containing some Schiff base), TAN 3.90 in 8% yield, and N,N-diheptadecylaniline, TAN 2.11 in 46% yield.

EXAMPLE 29

This example illustrates the process of the present invention employing aromatic amines other than aniline.

The process of Example 19 is repeated employing the same times, conditions, temperatures, and reactants, except that the aniline is replaced respectively by an equimolar amount of p-anisidine, 2,6-xylidine, and then 1-amino-naphthalene, with similar results.

Although the invention has been described in considerable detail with reference to certain preferred embodiments thereof, it will be understood that variations and modifications can be effected within the spirit and scope of the invention as described above and as defined in the appended claims.

What is claimed is:

1. A process for preparing N-alkylated aromatic amines which comprises reacting at a temperature of from about 125°–200° C. and at a pressure of from about 200–2000 p.s.i.g., a reaction mixture of carbon monoxide, hydrogen, an aromatic amine having the formula

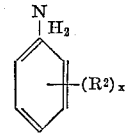

wherein
R$^2$ is halogen, a lower alkyl or lower alkoxy, and
$x$ is an integer from 0–3, inclusive,
and an olefin having the formula $$CnHmR^3$$

wherein $n$ is an integer from 2 to 27 inclusive,
$m$ equals $2n$, $2n-1$ or $2n-2$, and
R$^3$ is hydrogen, hydroxy, nitrile or

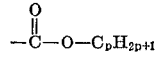

where $p$ is an integer from 1 to 27 inclusive,
in the presence of a catalyst consisting of a complex of a salt selected from the group consisting of a rhodium halide, a ruthenium halide and a cobalt carbonyl with a complexing agent selected from the group consisting of trihydrocarbyl phosphine, trihydrocarbyl arsine and trihydrocarbyl stibine in which said hydrocarbyl substituent is a lower alkyl or phenyl radical, and wherein said reaction mixture the molar ratio of hydrogen to carbon monoxide is at least about 2:1 respectively, and the molar ratio of the aromatic amine to the olefin is from about 1:1 to 4:1, respectively.

2. The process of claim 1 wherein the salt is a rhodium or ruthenium halide.

3. The process of claim 2 wherein the salt is rhodium trichloride.

4. The process of claim 3 wherein the complexing agent has the formula:

$$(R^1)_3X$$

wherein
R$^1$ is phenyl or lower alkyl and
X is phosphorus, arsenic or antimony.

5. The process of claim 3 wherein the complexing agent has the formula:

$$(R^1)_3X$$

wherein
R$^1$ is phenyl or lower alkyl and
X is phosphorous.

6. The process of claim 5 wherein the catalyst is rhodium trichloride tris(triphenylphosphine).

7. The process of claim 6 wherein the aromatic amine is aniline.

8. The process of claim 7 wherein the olefinic compound is selected from the group consisting of esters of ethylenically unsaturated fatty acids and ethylenically unsaturated fatty nitriles.

References Cited

UNITED STATES PATENTS

| | | | |
|---|---|---|---|
| 2,750,417 | 6/1956 | Closson et al. | 260—577 |
| 2,859,251 | 11/1958 | Linn | 260—577 |
| 3,217,040 | 11/1965 | Schmerling | 260—577 |
| 3,321,514 | 5/1967 | Eisenmann | 260—404 |
| 3,444,203 | 7/1965 | Kurtz | 260—577 |

FOREIGN PATENTS

| | | | |
|---|---|---|---|
| 1,459,643 | 10/1966 | France | 260—453 |

OTHER REFERENCES

Fieser et al.: Organic Chem. (1956), Rheinhold Pub. Co., N.Y., 3rd. ed., pp. 197, 211 and 212.

Wilkinson: "Hydrogenation, hydroformylation and Carbonylation with Halogen Complexes," (1966), CA67, No. 53652d (1967).

LEWIS GOTTS, Primary Examiner

G. HOLLRAH, Assistant Examiner

U.S. Cl. X.R.

8—115.5; 44—66, 71, 72, DIG. 1; 117—139.5; 260—2R, 77.5CH, 78R, 465E, 471A, 518, 553, 558, 561, 566, 567.6, 576, 577, 599, 618R, 618F, 618H; 424—304, 309, 316, 317, 318, 326, 329